United States Patent [19]

Kaiser

[11] Patent Number: 5,254,175
[45] Date of Patent: Oct. 19, 1993

[54] PROCESS FOR REMOVING CONTAMINANTS, IN PARTICULAR MATERIAL RESIDUES, IN POORLY ACCESSIBLE MACHINE PARTS

[76] Inventor: Hans-Gerd Kaiser, Germanenstr. 44, D-5650 Solingen 1, Fed. Rep. of Germany

[21] Appl. No.: 549,001
[22] PCT Filed: Jan. 24, 1989
[86] PCT No.: PCT/EP89/00068
§ 371 Date: Jul. 18, 1990
§ 102(e) Date: Jul. 18, 1990
[87] PCT Pub. No.: WO89/07130
PCT Pub. Date: Aug. 10, 1989

[30] Foreign Application Priority Data

Jan. 26, 1989 [DE] Fed. Rep. of Germany ....... 3802127

[51] Int. Cl.$^5$ .................... B08B 3/04; B08B 9/02; C23G 1/14; C23G 1/24
[52] U.S. Cl. ..................... 134/2; 134/22.16; 134/22.19; 134/28; 134/38; 134/40; 252/135
[58] Field of Search ............ 134/38, 2, 22.16, 23, 134/22.19, 28, 40; 252/111, 109, DIG. 8, 174.14, 135

[56] References Cited

U.S. PATENT DOCUMENTS

| 2,442,100 | 5/1948 | Showalter | 134/22.16 |
| 3,367,878 | 2/1968 | Mankowich . | |
| 3,806,460 | 4/1974 | Mukai | 252/111 |
| 4,345,949 | 8/1982 | Park et al. | 134/22.16 |
| 4,692,263 | 9/1987 | Eberhardt | 252/DIG. 8 |
| 4,784,788 | 11/1988 | Lancz | 252/109 |

FOREIGN PATENT DOCUMENTS

| 7710987 | 2/1988 | Australia . |
| 8006787 | 5/1988 | Australia . |
| 1761988 | 12/1988 | Australia . |
| 1894288 | 1/1989 | Australia . |
| 2345488 | 4/1989 | Australia . |
| 2511188 | 5/1989 | Australia . |
| 2300744 | 7/1973 | Fed. Rep. of Germany . |
| 3802127 | 3/1990 | Fed. Rep. of Germany . |
| 2593187 | 7/1987 | France . |
| 57-147501 | 9/1982 | Japan . |

OTHER PUBLICATIONS

G. Schenkel, *Schneckenpressen fur Kunststoffe*, Carl Hanser Verlag Muchen, 1959, p. 384.
Dr. O. A. Neumuller, *Rompps Chemie-Lexikon*, 8. Auflage, Franckh'she Verlagshandlung Stuttgart, 1985, pp. 2563-2564.
*Brockhaus ABC Chemie*, VEB F. A. Brockhaus Verlag Leipzig, 1971, p. 579.
Report on Experiments (Hoechst AG).
Report on Results of Comparative Experiments (Kaiser).
English transtation of JP 57-147501 (Sep. 1982).
Chemical Abstract 99: 38980b, vol. 99, 1983, entitled Cleaning polymerization reactors contaminated with carboxylated polymers.

*Primary Examiner*—Paul Lieberman
*Assistant Examiner*—Erin M. Higgins
*Attorney, Agent, or Firm*—Speckman, Pauley & Fejer

[57] ABSTRACT

A cleaning agent for cleaning poorly accessible machine parts in transport or molding of materials in a pasty state, in particular for removal of molding material residues on changeover of the materials. The cleaning agent contains either inorganic salt or organic salt in solution with at least one of either an inorganic solvent and a polar organic solvent. A melting point of the inorganic salt or organic salt is above a processing temperature of the subsequent material. A boiling point of the inorganic solvent or the polar organic solvent is below a processing temperature of the subsequent material.

3 Claims, No Drawings

PROCESS FOR REMOVING CONTAMINANTS, IN PARTICULAR MATERIAL RESIDUES, IN POORLY ACCESSIBLE MACHINE PARTS

BACKGROUND OF THE INVENTION

The present invention relates to a cleaning agent and a cleaning process for cleaning poorly accessible machine parts, such as in the transport and/or molding of materials in a pasty state, in particular in combination with the changeover of the processed material. This principally involves the removal of molding material residues on changeover to another material. Thus, this invention relates to a simplification of the changeover of molding material to be processed in plastic-processing machines, such as extruders, injection-molding machines, and blow-molding equipment by accelerating the removal of a previous substance from the plasticizer unit and the nozzle region; an analogous field of use of this invention is, for example, in the operation of kneaders.

A wide variety of different cleaning agents have been used in technical and household applications. For example, French Reference A-2,593,187 relates to a degreasing agent for metal and plastics parts, the degreasing agent containing, apart from water and sodium metasiliate, glycol ethers and alkylbenzene sulfonates as active ingrediants.

U.S. Pat. No. 3,367,878 discloses a cleaning agent for removing asphalt, sodium and/or metallic soap greases, road dirt, forming and cutting oils, and aviation dirt from ferrous and non-ferrous metal surfaces. The cleaning agent contains specific glycols, such as hexylene glycol and propylene glycol, as active ingredients together with a specific organic chelating ingredient, namely the tetrasodium salt of ethylene diamine tetra-acetic acid in combination with water and sodium salts.

A cleanser for removing lard and other grease at temperatures of about 65.6° C. from ovens, cookers, pots and tiles is described in German Reference 2,300,744. This cleanser is a water-comprising composition with ammonia, or an organic amine together with organic cleaning compounds, and specific organic amides. The inorganic material which is also present in the cleanser German Reference 2,300,744 is, at least partly, an abrading agent.

In the production of defined moldings from pasty materials, such as thermoplastics or duroplastics, and also in the processing of other substances in the softened state, as the melt or paste, the following has been experienced: in machine parts which come into contact with the viscous molding material, for example the plasticizer unit and the nozzle in injection molding, moulding material is retained. These residues are gradually discharged on changeover and contaminate the subsequent moldings and result in moldings which are unusable for aesthetic or physical reasons.

This problem occurs, for example, in the plastics-processing industry when the color is changed within a series. There are considerable losses in time, energy and raw materials until products of perfect color are achieved.

Thus, it can be expected that a throughput of 650 kg of ABS (acrylonitrile-butadiene-styrene) material will be needed until pure white moldings are produced in a customary injection-molding manufacture of parts weighing 350 g on changing color from a beige ABS material to a similar white material.

The cleaning process outlined above, i.e. working with new material until perfect moldings are achieved, and discarding the unusable moldings made of a mixed material, cannot be justified from economics, such as material and energy costs for unusable products, and disposal, such as burden on dumps caused by unusable and substantially undecomposable moldings, environmental pollution on incineration, and poor opportunity for recycling due to the material mixture.

Disassembly and manual cleaning is likewise an expensive method. In order to circumvent this problem, a further method is known from the prior art.

This involves the introduction of abrasion particles, for example $Al_2O_3$, in suspension with organic solvents. The abrasion particles are added to the feed hopper of the plasticator together with the solvent, usually an aromatic, and the starting material in granule, chip or other form. Due to the combined action of the organic solvent, which at least causes the material residues in the screw channel and in the nozzles to swell, thus simplifying removal, and the abrasive action of the abrasion particles, the amount of unusable moldings made from a mixed material is significantly reduced due to the more rapid removal of residual substances.

However, cleaning agents of this type are not without problems from industrial safety and environmental standpoints.

The transport, storage and handling of cleaning agents of this type are associated with risks due to the necessary presence of organic solvents, whose flammability and/or toxicity makes them potential hazards.

For labor and property protection reasons, their handling is subject to official regulations, for example: West German Flammable Liquids Regulations; Transport of Hazardous Materials Regulations; Chemicals Act; Hazardous Industrial Materials Regulations. Since it is necessary for vapors to escape when these substances are warmed in the machine, the guide concentrations (MAC values) can easily be exceeded locally.

In addition, the amounts used are not inconsiderable. Depending on the dimensions of the machine to be cleaned, 0.2 l to 1.5 l of suspension are employed per changeover. The stocks in the plant must be arranged appropriately, which means that there is a considerable long-term risk.

In addition, the low stability of the suspensions results in careful mixing being necessary before use if the desired degree of distribution in the starting material, and thus the desired action, are to be achieved.

SUMMARY OF INVENTION

One object of the present invention is to provide a cleaning agent and a cleaning process which reliably and quickly helps to remove residues of previously processed molten material, using only a small amount of the subsequent material, it being possible to formulate the cleaning agent so that it is easy to handle and produces no fire and toxicity hazards.

This object was surprisingly achieved by a cleaning agent for machine parts used in the transport and molding of materials in a pasty state, and in particular, for the removal of material residues on changeover from a first material to a subsequent material without interruption to the operation of the machine consisting essentially of a salt in solution with a solvent. The salt is selected from the group consisting of an inorganic salt, an organic salt and mixtures thereof. The solvent is selected from the group consisting of an inorganic solvent, a polar organic solvent and mixtures thereof. In addition, the salt has a melting point which is higher than the processing temperature of the subsequent material and the solvent has a boiling point below the processing temperature of the subsequent material. The concentration of salt in the cleaning agent is at least 0.5% by weight based on a total weight of the solution up to a saturation limit for the salt at room temperature.

DESCRIPTION OF PREFERRED EMBODIMENT

As shown in a working example, the cleaning agent according to this invention is highly efficient. Material changeovers which otherwise require several hours and produce a large amount of rejects can be carried out within a few minutes. It must also be noted that $H_2O$ can be used as a solvent which presents absolutely no toxicological problems in humans or the environment. Regarding salts having suitable melting points, there is a sufficiently large choice of substances, known to any chemist, which are not hazardous materials. Most of the plastics-processing processes which are important here operate at temperatures between 100° and 200° C. It is important that the salts, solvents and all the additives must be colorless and inert at the processing temperature of subsequent material.

Because the active substance and the organic and/or inorganic salt are, in accordance with this invention, in the form of a solution, homogeneity is ensured. Separation, with subsequent distribution problems in the granules, i.e. a poor cleaning action, cannot occur.

With respect to homogeneous dispersion in the material for plastification, however, addition of surfactants so that the surface tension between the particular plastic and the cleaning solution is reduced proves expedient in the process and agent according to this invention.

The cleaning process and agent of this invention are not limited to certain types of material or certain combinations of successive substances. Examples which may be mentioned are: acrylonitril-butadiene-styrene resin (ABS), acrylonitrilmehtylmethacrylate resin (AMMA), celluloseacetate resin (CA), diallylphthalate resin (DPA), epoxide resin (EP), ethylene-vinylacetate resin (EVA), ethylene-vinylalcohol resin (EVAL), high density polyethylene (HDPE), low density polyethylene (LDPE), methyl methacrylate-styrene resin (MBS), polyamide (PA), polycarbonate (PC), polymethylmethacrylate (PMMA), polystyrene (PS), polyvinylchloride (PVC), polyoxymethylene (POM), polypropylene (PPR), poly-butylene-terephthalate (PBT), styrene-acrylonitril resin (SAN) and urea-formaldehyde resin (UF). The molding materials may be filled or unfilled.

With regard to the reduction of the danger of corrosion of metallic machine parts, it proves expedient to employ a cleaning solution having a pH of from 7 to 14. The use of a basic salt, such as $Na_2CO_3$, or alternatively sodium metasilicate is appropriate due to the acid-neutralizing action, in particular when PVC or other acid-eliminating materials are used.

Although it is generally not necessary to use organic polar or non-polar solvents in the present invention, it may be expedient, in the case of residues which are particularly difficult to remove, to add organic solvents, if appropriate together with an emulsifier, to the cleaning solution. In these cases too, the amount of solvent employed is many times smaller than in the case of conventional cleaning suspensions, with the same cleaning action.

The concentration of the salt in the cleaning agent according to this invention can vary within broad limits. An activity lower limit for the concentration is at about 0.5% by weight. For reasons of easier handling during transport and storage and in order to limit the volume of liquid to be evaporated, higher concentrations are advisable as long as the viscosity does not complicate discharge and distribution. However, it is of course possible to appropriately dilute a solution concentrated in this way "on site". In addition, salts and solvents can be kept separate before use. The actual cleaning solution is then prepared immediately before use by dissolving the solid salts. It is likewise possible to keep additives, for example alkalinizing agents such as NaOH, separate for storage and transport in the form of a "kit of parts" and only to add them when the solution is used.

The working example below illustrates the effectiveness of the procedure according to this invention:

Example

The following materials were processed under laboratory and production conditions, colored pigments being used in batch, powder and liquid state: ABS, CA, HPDE, LPDE, PA, polyamide of -aminocapronic acid (PA 6), polyamide of hexamethylenediamine and adipinic acid (PA 6.6), PA 11, PA 12, PC, polyethylene (PE), PMMA, PPO, PPS, PS, soft PVC, SAN, PBT and PPR.

Most of the PA groups have been modified with short and long glass fibres and with glass beads up to 35%, and also with MoS (2 to 2.5%).

Experiments were carried out in the following injection-molding machines:

| Arburg 221 - 75 - 350 | Screws: 0 20 |
| | 0 25 |
| | 0 30 |
| Arburg 30 - 210 - 700 | 0 30 |
| | 0 40 |
| | 0 45 |
| Arburg Eco 305 - 700 - 230 | 0 35 |
| | 0 40 |
| Rico 110 | 0 60 |
| | 0 65 |

1. Production of casings for automatic coffeemakers:

| Machine: | 200 t |
| Screw: | 65 0 |
| Mold: | hot channel 1-fold |
| Material: | ABS - colors |

Changeover from dark brown to beige:
a) conventionally by introducing the subsequent material
   it was necessary to twice disassemble the mold and carry out mechanical cleaning before the beige color shade was satisfactory

| Material consumption: | about 600 kg of ABS |
| Time consumption: | about 10 hours | b) using the cleaning agent according to the invention (Na$_2$CO$_3$, 10% strength by weight, in distilled H$_2$O; 0.03 kg)

| Material consumption: | about 6 kg of ABS |
| --- | --- |
| Time consumption: | about 15 minutes |

The changeover was likewise completed in about 15 minutes using sodium metasilicate (10% strength by weight in distilled H$_2$O; 0.03 kg).

II. Production of disposable razors:

| Machine: | 250 t |
| --- | --- |
| Screw: | 80 0 |
| Mould: | hot channel, 12-fold |
| Material: | high-impact PS colour on colour changeover | a) conventionally without cleaning agent with multiple disassembly of the mould and mechanical cleaning in each case before the changeover was complete

| Material consumption: | about 350 kg of PS |
| --- | --- |
| Time consumption: | about 24 hours |

Simple cleaning (only the plasticizing unit) took about 10 minutes.

Vented screws were an exception. They could not be cleaned according to the invention in the pressure-free end region, but instead had to be subjected to manual cleaning.

What is claimed is:

1. A process for cleaning machine parts used in transport and molding of materials in a pasty state including the removal of material residues on changeover from a first said material to a different material, the improvement comprising: introducing a solution comprising a salt selected from the group consisting of an organic salt, an inorganic salt and mixtures thereof and a solvent selected from the group consisting of an inorganic solvent, a polar organic solvent and mixtures thereof, which solvent dissolves said salt, into an operating machine together with a first batch of said different material, said solution having a salt concentration of said salt of at least 0.5% by weight based on a total weight of said solution up to a saturation limit for said salt at room temperature, said salt having a melting point above a processing temperature of said subsequent material, and said solvent having a boiling point below a processing temperature of said subsequent material.

2. In a process according to claim 1, wherein said at least one of said polar inorganic solvent and said organic solvent is water; a salt component of said solution is at least one of alkali metal carbonates, alkali metal metasilicates, alkali metal tartrates, alkali metal acetates and mixtures thereof; said boiling point is at least 30° C. below said processing temperature; and said melting point is at least 50° C above said processing temperature.

3. A process according to claim 1, wherein at least one of surfactants, organic solvents, alkalinizing agents, emulsifiers and abrasion particles is introduced into said operating machine.

* * * * *